(12) United States Patent
Mayer

(10) Patent No.: US 9,139,185 B2
(45) Date of Patent: Sep. 22, 2015

(54) METHOD FOR OPERATING A BRAKING SYSTEM OF A VEHICLE WHICH IS EQUIPPED WITH A PLUNGER DEVICE AND A CONTROL UNIT FOR A BRAKING SYSTEM OF A VEHICLE WHICH IS EQUIPPED WITH A PLUNGER DEVICE

(71) Applicant: Robert Bosch GmbH, Stuttgart (DE)

(72) Inventor: Jochen Mayer, Giengen an der Brenz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/363,236

(22) PCT Filed: Oct. 8, 2012

(86) PCT No.: PCT/EP2012/069825
§ 371 (c)(1),
(2) Date: Jun. 5, 2014

(87) PCT Pub. No.: WO2013/083310
PCT Pub. Date: Jun. 13, 2013

(65) Prior Publication Data
US 2015/0051805 A1 Feb. 19, 2015

(30) Foreign Application Priority Data

Dec. 5, 2011 (DE) .......................... 10 2011 087 689

(51) Int. Cl.
*B60T 13/66* (2006.01)
*B60T 13/14* (2006.01)
*B60T 13/68* (2006.01)
*B60T 8/40* (2006.01)

(52) U.S. Cl.
CPC .............. *B60T 13/662* (2013.01); *B60T 8/4072* (2013.01); *B60T 13/145* (2013.01); *B60T 13/686* (2013.01)

(58) Field of Classification Search
CPC ....... B60T 8/38; B60T 8/4022; B60T 8/4031; B60T 8/4054; B60T 8/4881; B60T 8/4072; B60T 11/244; B60T 11/12; B60T 11/232
USPC ........ 701/70; 303/113.2, 115.4, 116.6, 199.1, 303/119.1; 60/562, 578, 582, 589
See application file for complete search history.

(56) References Cited

U.S. PATENT DOCUMENTS 5,044,702 A * 9/1991 Beck et al. .................. 303/113.2
5,788,341 A * 8/1998 Penrod et al. .............. 303/115.2

FOREIGN PATENT DOCUMENTS

DE  196 04 134       8/1997
DE  10 2009 000577   8/2010

(Continued)

*Primary Examiner* — Marthe Marc-Coleman
(74) *Attorney, Agent, or Firm* — Kenyon & Kenyon LLP

(57) ABSTRACT

A method for operating a braking system of a vehicle which is equipped with a plunger device, including the increasing of a brake pressure in at least one brake circuit of the braking system by transferring a brake fluid volume from the plunger device into the at least one brake circuit of the braking system, the method including: comparing an actual pressure variable to a predefined reference pressure variable with regard to an actual pressure present at least in one subsection of the braking system before the brake pressure is increased; and reducing at least a pre-pressure in the braking system prior to transferring the brake fluid volume from the plunger device into the at least one brake circuit if the actual pressure variable exceeds the reference pressure variable. A control unit is also described for a braking system of a vehicle which is equipped with a plunger device.

14 Claims, 6 Drawing Sheets

(56) References Cited

FOREIGN PATENT DOCUMENTS

| EP | 0 565 153 | 10/1993 |
| EP | 2 100 784 | 9/2009 |
| WO | 2011/098176 | 8/2011 |
| WO | 2011/104056 | 9/2011 |

* cited by examiner

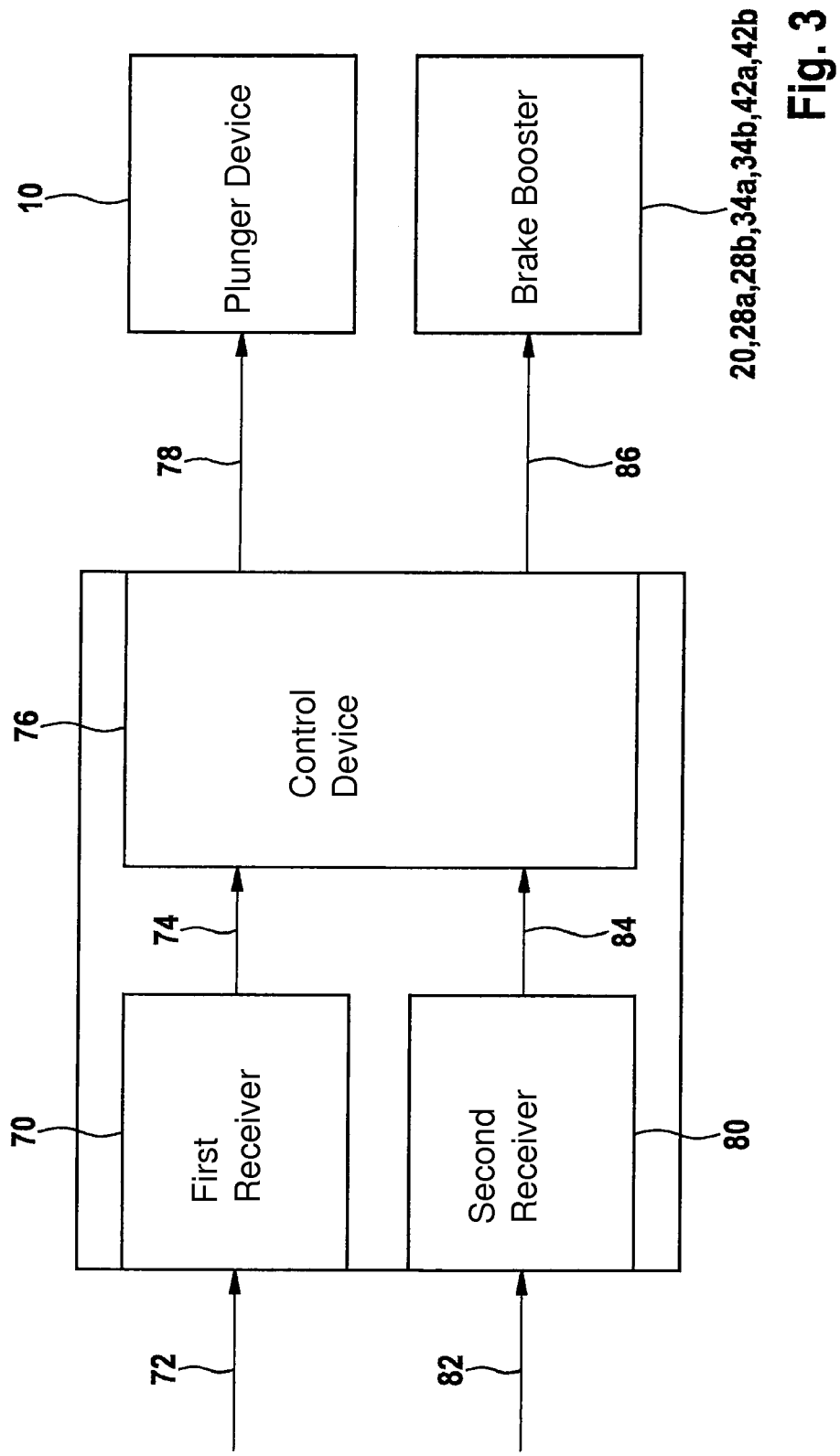

METHOD FOR OPERATING A BRAKING SYSTEM OF A VEHICLE WHICH IS EQUIPPED WITH A PLUNGER DEVICE AND A CONTROL UNIT FOR A BRAKING SYSTEM OF A VEHICLE WHICH IS EQUIPPED WITH A PLUNGER DEVICE

FIELD OF THE INVENTION

The present invention relates to a method for operating a braking system of a vehicle which is equipped with a plunger device. Furthermore, the present invention relates to a control unit for a braking system of a vehicle which is equipped with a plunger device.

BACKGROUND INFORMATION

Patent document EP 0 565 153 A1 discusses a train monitoring system. The train monitoring system has a plunger device including a cavity which may be filled with a fluid and which is delimited by a plunger which is displaceable along a displacement axis. It is supposed to be possible to increase a brake pressure present in at least one wheel brake caliper by transferring a brake fluid volume from the cavity to the at least one wheel brake caliper by displacing the plunger.

SUMMARY OF THE INVENTION

The present invention provides a method for operating a braking system of a vehicle which is equipped with a plunger device having the features described herein, a control unit for a braking system of a vehicle which is equipped with a plunger device having the features described herein, and a braking system for a vehicle having the features described herein.

A plunger device generally has a motor and/or a transmission which is/are configured to displace/transfer a fluid from the plunger device into a different volume against a counterpressure present therein which is below a counterpressure limit. If the counterpressure, however, exceeds the predefined/design-based counterpressure limit, the displacement of fluid from the plunger device into the volume is conventionally often no longer possible. With the aid of the present invention, it is, however, possible to displace/transfer the fluid into the target volume even despite a counterpressure which is higher than the predefined/design-based counterpressure limit.

With the aid of the present invention, it is also no longer necessary to configure a plunger device, in particular its motor and/or transmission, in such a way that it is able to reach a comparatively high counterpressure limit in order to counteract a counterpressure. The present invention may thus be used for employing a cost-effective plunger device in a braking system of a vehicle which requires little installation space and/or has low energy consumption. In this way, the energy consumption and the pollutant emission of the vehicle equipped therewith are also reducible.

At least one valve device of the braking system may be controlled to an at least partially open state in order to reduce at least the pre-pressure in the braking system. In this way, brake fluid may be displaced into at least one storage chamber of the braking system and/or into a subsection/remaining section of the braking system, which is spaced apart from the plunger device, via the at least one valve device which is controlled to the at least partially open state. This causes a reliable reduction of at least the pre-pressure in the braking system, so that the brake fluid volume may be subsequently easily transferred from the plunger device into the at least one brake circuit of the braking system with the aid of the plunger device.

For example, at least one wheel outlet valve may be controlled to the at least partially open state as the at least one valve device in order to reduce at least the pre-pressure in the braking system. This causes a displacement of brake fluid from the at least one brake circuit having the at least one wheel outlet valve, which is controlled to the at least partially open state, into at least one storage chamber, whereby the brake pressure present in the particular brake circuit is reduced comparatively quickly.

Likewise, at least one high-pressure switching valve and/or a switchover valve may be controlled to the at least partially open state as the at least one valve device in order to reduce at least the pre-pressure in the braking system. In this way, at least the pre-pressure of the braking system is reducible at least below the counterpressure limit within a comparatively short time period.

Alternatively or additionally, a brake support force which is applied to at least one displaceable piston of a brake master cylinder of the braking system may be reduced with the aid of a brake booster device of the braking system in order to reduce at least the pre-pressure in the braking system. By reducing the brake support force, the pressure which is present in the brake master cylinder and in the at least one section of the braking system which is hydraulically connected to the brake master cylinder may be reduced in an energy-saving manner. In this way, energy consumption and/or pollutant emission of a vehicle may be reduced which is/are driven with the aid of the specific embodiment of the method described here.

In one advantageous refinement, a reduction of a restoring force which results from the reduction of at least the pre-pressure and which is applied to the at least one displaceable piston of the brake master cylinder may be compensated for at least to some extent by reducing the brake support force of the brake booster device of the braking system. It is also possible to describe this in other words, namely that the at least one displaceable piston of the brake master cylinder is kept in/restored to a position it assumed prior to the reduction of the pre-pressure by reducing the brake support force. In this way, it may be prevented that the driver notices the reduction of the pre-pressure as a "softening" of the brake actuating element. The refinement described here thus ensures an advantageous brake actuating feeling (pedal feeling) for the driver.

In addition, after reducing at least the pre-pressure in the braking system by a pressure difference and after transferring the brake fluid volume from the plunger device into the at least one brake circuit, at least the pre-pressure in the braking system may be increased by the pressure difference. It may be achieved in this way that after the method steps described here have been carried out, the braking system is in a system state which corresponds to a transferring of the brake fluid volume from the plunger device into the at least one brake circuit against a counterpressure which is above the counterpressure limit. The braking system may thus be operated in such a way as if the counterpressure limit does not exist.

The advantages described in the previous paragraphs are also ensured by a corresponding control unit for a braking system of a vehicle which is equipped with a plunger device.

Moreover, the above-described advantages are also implementable with the aid of a corresponding braking system for a vehicle.

Additional features and advantages of the present invention are explained in the following on the basis of the figures.

BRIEF DESCRIPTION OF THE DRAWINGS

FIG. 3 shows a schematic representation of a specific embodiment of the control unit.

DETAILED DESCRIPTION

Figure 1A:
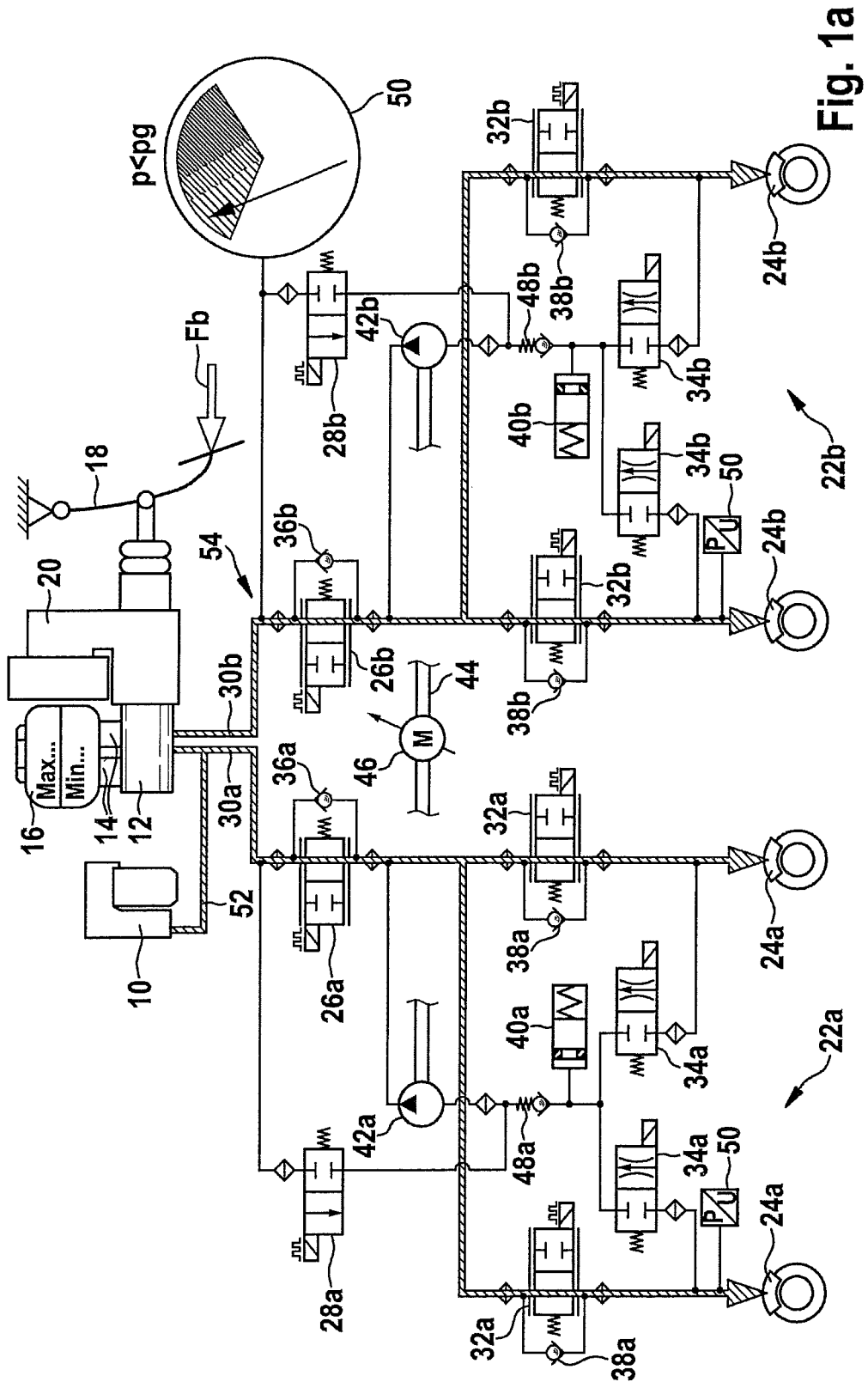
FIGS. 1a through 1d show four schematic representations of a braking system which is operated with the aid of a first specific embodiment of the method.

FIGS. 1a through 1d show four schematic representations of a braking system which is operated with the aid of a first specific embodiment of the method.

The braking system which is represented schematically in FIGS. 1a through 1d is equipped with at least one plunger device 10. Plunger device 10 may be understood to mean a device whose storage volume, which may be filled with fluid, is delimited by a displaceable plunger component/piston component, in particular by a plunger or a piston. In order to displace the plunger component/piston component, plunger device 10 may have an electric motor which is connected to the plunger component/piston component via a transmission in such a way that the plunger component/piston component is displaceable by an operation of the motor into a first displacement direction and into a second displacement direction, which is directed against the first displacement direction. By displacing the plunger component/piston component, the volume of the storage volume, which may be filled with fluid, of plunger device 10 may be optionally increased or reduced. Increase in the storage volume may result in brake fluid being displaced from the braking system which is equipped with plunger device 10 into the storage volume. Accordingly, the reduction of the storage volume may result in brake fluid being pushed from plunger device 10 into the braking system against a counterpressure present therein.

It is pointed out that equipping the braking system with plunger device 10 is not limited to a certain plunger type. Instead, a plurality of different possible implementations may be used for plunger device 10 described above in the case of different motors and/or transmissions for the method which is described in the following.

The braking system may also include components described in the following in addition to plunger device 10. However, it is pointed out that equipping the braking system with the additional components is optional. In particular, the implementability of the method does not require a certain configuration from the additional components of the braking system.

The braking system may have a brake master cylinder 12 which may be connected to a brake fluid reservoir 16 via at least one replacement bore 14, e.g., a compensating bore. A brake actuating element 18, e.g., a brake pedal, may be situated on brake master cylinder 12 in such a way that with the aid of a driver braking force Fb which is applied to brake actuating element 18, at least one displaceable piston of brake master cylinder 12 is displaceable in such a way that an internal pressure present in brake master cylinder 12 is increasable. In addition, the braking system may also have a brake booster device 20 with the aid of which an additional brake support force is excitable on the at least one displaceable piston of brake master cylinder 12. Brake booster device 20 may include a hydraulic actuator device, an electromechanical actuator device and/or a pneumatic actuator device. A certain configuration of brake booster device 20 is not necessary for carrying out the method described below.

FIGS. 1a through 1d illustrate the braking system as a dual-circuit braking system having a first brake circuit 22a and a second brake circuit 22b. The implementability of the method described below, is, however, not limited to a dual-circuit braking system having two wheel brake calipers 24a and 24b per each of brake circuits 22a and 22b. Instead, the number of brake circuits 22a and 22b and/or of wheel brake calipers 24a and 24b may be adapted to the vehicle which is equipped with the braking system. Moreover, the wheels which are assigned to wheel brake calipers 24a and 24b of a brake circuit 22a and 22b may be situated on a common axle or diagonally at the vehicle.

Each of brake circuits 22a and 22b may have a switchover valve 26a and 26b and/or a high-pressure switching valve 28a and 28b in each case. Switchover valve 26a or 26b and/or high-pressure switching valve 28a or 28b of a brake circuit 22a or 22b may be connected to brake master cylinder 12 via a feed line 30a or 30b. Moreover, each wheel brake caliper 24a and 24b may also be assigned a wheel inlet valve 32a and 32b and a wheel outlet valve 34a and 34b in each case. A bypass line having a check valve 36a and 36b may run in parallel to each switchover valve 26a. The particular check valve 36a and 36b is in this case oriented in such a way that a brake fluid displacement does not take place from connected wheel inlet valves 32a or 32b to brake master cylinder 12 via the bypass line. Moreover, another bypass line having a check valve 38a and 38b may be situated in parallel to each wheel inlet valve 32a and 32b. With the aid of a suitable orientation of check valves 38a and 38b, a brake fluid displacement from assigned wheel brake caliper 24a or 24b to connected switchover valve 26a or 26b is possible in this case via the bypass line which is guided in parallel to wheel inlet valve 32a or 32b.

In the represented specific embodiment, wheel brake calipers 24a and 24b of a brake circuit 22a and 22b are hydraulically connected to a storage chamber 40a and 40b in each case via wheel outlet valves 34a and 34b. By opening assigned wheel outlet valves 34a and 34b, brake fluid may thus be displaced from wheel brake calipers 24a and 24b of a brake circuit 22a and 22b into assigned storage chamber 40a or 40b. Each of storage chambers 40a and 40b is connected to a switchover valve 26a or 26b via a pump 42a and 42b in each case. In the case of a dual-circuit configuration of the braking system, the two pumps 42a and 42b may be situated on a common shaft 44 of a motor 46. Moreover, a check valve 48a and 48b may be situated in each case between a storage chamber 40a and 40b and a pump 42a and 42b which is hydraulically connected thereto. Each of storage chambers 40a and 40b may also be hydraulically connected to high-pressure switching valve 28a and 28b of assigned brake circuit 22a and 22b via assigned check valve 48a and 48b. With the aid of a suitable orientation of check valves 48a and 48b, transferring fluid into hydraulically connected storage chamber 40a or 40b via check valve 48a and 48b is preventable despite a high pressure at a pump 42a and 42b or at a high-pressure switching valve 28a and 28b.

Instead of a similar configuration of the two brake circuits 22a and 22b, as in FIGS. 1a through 1d, the braking system may also have two differently configured brake circuits 22a and 22b. Moreover, at least one of brake circuits 22a and 22b may also be equipped with at least one additional component.

The braking system which is driven with the aid of the method described in the following may have at least one pressure sensor 50. The at least one pressure sensor 50 may, for example, be situated at a high-pressure switching valve 28a and 28b and/or at at least one wheel brake caliper 24a and 24b. It is pointed out that the implementability of the method is not limited to the utilization of a certain number of pressure sensors 50.

In the case of the braking system in FIGS. 1a through 1d, plunger device 10 is connected to a feed line 30a of a first brake circuit 30a via a line 52. The implementability of the method described in the following however, does not require such a connection of plunger device 10 to the braking system.

Plunger device 10 may be used to optionally increase or reduce a brake pressure present in the at least one wheel brake caliper 24a and 24b. For example, plunger device 10 may be used to increase a hydraulic braking torque of wheel brake calipers 24a and 24b by pushing brake fluid out of plunger device 10 into the at least one brake circuit 22a and 22b. By increasing the hydraulic braking torque of wheel brake calipers 24a and 24b, the vehicle which is equipped with this system is brakeable more quickly.

In one advantageous possible application, a non-hydraulic additional braking torque, e.g., a generator braking torque of a generator (not illustrated), may be incorporated by using plunger device 10. By pushing brake fluid out of plunger device 10 into the at least one wheel brake caliper 24a and 24b, it is possible, for example, to increase the hydraulic braking torque of the at least one wheel brake caliper 24a and 24b in such a way that a reduction over time of the non-hydraulic additional braking torque may (at least to some extent) be compensated for. Likewise, by taking up brake fluid from the at least one brake circuit 22a and 22b into plunger device 10, the hydraulic braking torque of the at least one wheel brake caliper 24a and 24b may be reduced in such a way that an overall braking torque, including the hydraulic braking torque and the non-hydraulic additional braking torque, remains (at least almost) constant despite a increase over time in the non-hydraulic additional braking torque. It is pointed out, however, that the implementability of the method described in the following is not limited to a braking system which is equipped with a generator.

With the aid of the method, a brake pressure in the at least one brake circuit 22a and 22b of the braking system may be increased. This may take place by transferring a brake fluid volume from plunger device 10 into the at least one brake circuit 22a and 22b. Prior to transferring the brake fluid volume, at least one actual pressure variable is compared to a predefined reference pressure variable with regard to an actual pressure present at least in one subsection of the braking system before the brake pressure is increased. The at least one actual pressure variable may be a sensor variable, for example, which is provided by the at least one pressure sensor 50. Likewise, the at least one actual pressure variable may be established/estimated by an electronic estimation and/or evaluation unit. Establishing/estimating the at least one actual pressure variable may in particular be carried out, taking into account a brake actuating intensity variable, e.g., driver braking force Fb, and/or a piece of fill level information with regard to a brake fluid quantity filled into the storage volume of plunger device 10. A driver braking force/fill level relation variable may thus also be compared as the actual pressure variable instead of a pressure value. The at least one predefined reference pressure variable may correspond to a reference pressure; starting from the presence of this pressure at least in feed line 30a which is connected to line 52, it is hardly/no longer possible to push brake fluid out of plunger device 10 into feed line 30a.

Generally, while brake fluid is being pushed out of the plunger device into a target volume, a plunger device 10 is configured to counteract a counterpressure p present in the target volume until counterpressure p is below a counterpressure limit pg. If internal pressure p present in the target volume exceeds counterpressure limit pg, the force, which is applicable to the plunger component/piston component via the electric motor and the transmission, is frequently no longer sufficient to push the brake fluid into the target volume against counterpressure p by displacing the plunger component/piston component. The reference pressure variable may therefore correspond in particular to counterpressure limit pg.

It is, however, pointed out that the reference pressure variable which is predefined for comparison is not limited to a counterpressure limit pg which is specific to plunger device 10. Instead, the reference pressure variable may also correspond to a relation between a driver braking force Fb and a piece of charging state information of plunger device 10, starting from which a counterpressure p is expected to be greater than or equal to counterpressure limit pg. Thus, it is also possible to use a driver braking force/fill level reference variable as the reference pressure variable instead of a pressure value.

FIG. 1a shows the braking system in an operating situation in which counterpressure p, which is measurable with the aid of a pressure sensor 50, is below a counterpressure limit pg of plunger device 10 in a brake circuit section 54 of a second brake circuit 22b, which is delimited by brake master cylinder 12, switchover valve 26b of second brake circuit 22b, and high-pressure switching valve 28b of second brake circuit 22b. (Due to the placement of a displaceable intermediate piston (not illustrated), e.g., of a floating piston, between a first pressure chamber of the brake master cylinder, to which first brake circuit 22a is connected, and a second pressure chamber of the brake master cylinder, to which second brake circuit 22b is connected, the pressure present in feed line 30a of first brake circuit 22a and line 52 is less than counterpressure limit pg.) The actual pressure variable thus does not exceed the reference pressure variable. In this way, the plunger component/piston component may be displaced by operating the motor of plunger device 10 in such a way that the storage volume, which may be filled with fluid, of plunger device 10 is reduced and a brake fluid is displaced from plunger device 10 into wheel brake calipers 24a and 24b in order to increase their hydraulic braking torques.

Figure 1B:
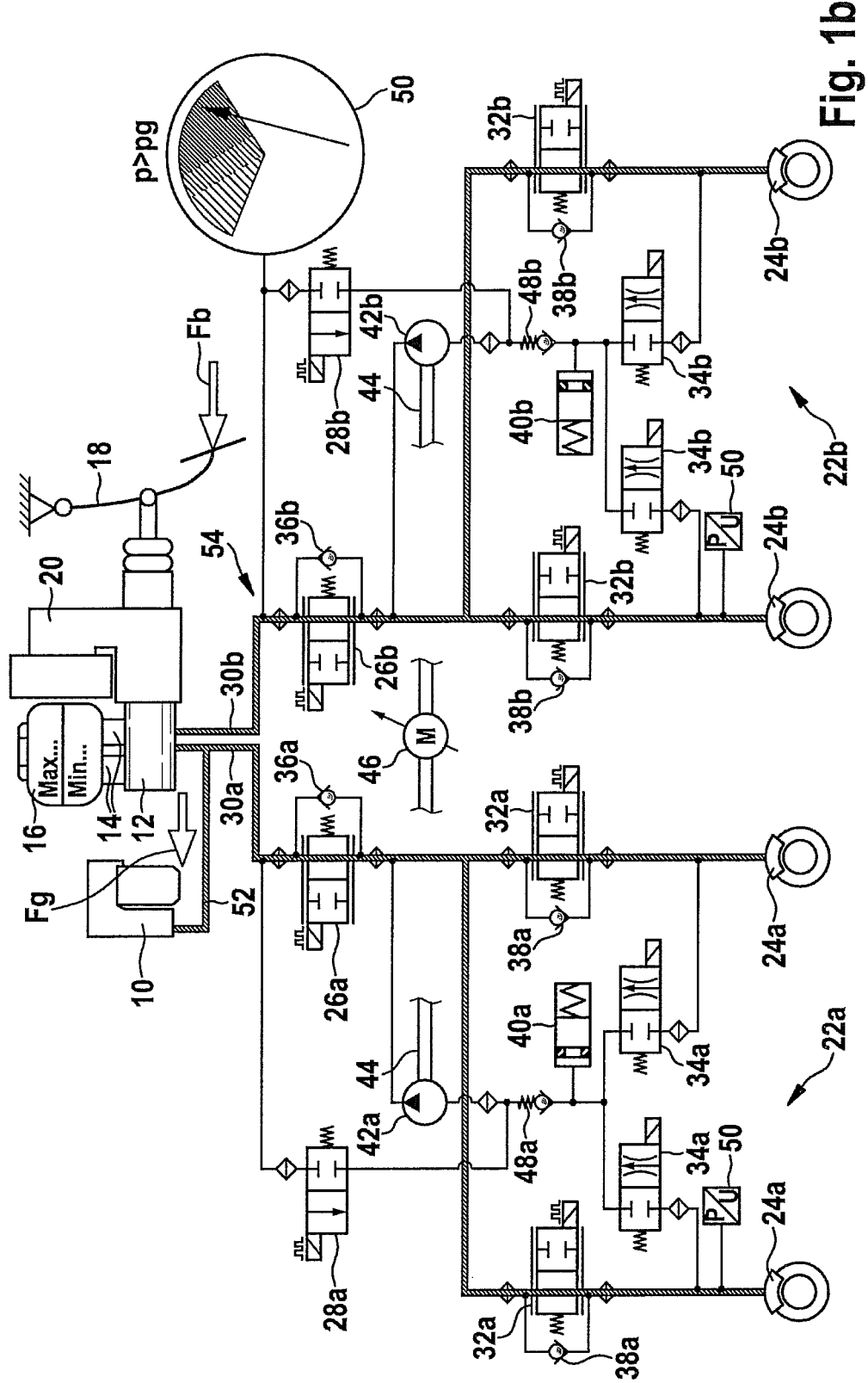

FIG. 1b shows the braking system of an operating situation in which counterpressure p present in brake circuit section 54 is greater than counterpressure limit pg of plunger device 10. (Due to the (standard) equipment of brake master cylinder 12 with a displaceable intermediate piston, pressure p in feed line 30a of the first brake circuit and of line 52 is thus also greater than counterpressure limit pg.) Thus, a counterforce Fg which may be hardly/not at all overcome by the motor and/or the transmission of plunger device 10 acts against the displacement movement of the plunger component/piston component to be carried out in order to push brake fluid out of the storage volume of plunger device 10. Based on FIG. 1c, it is explained, however, how it is still possible to displace brake fluid into the at least one brake circuit 22a and 22b of the braking system with the aid of plunger device 10 despite this operating situation involving a counterpressure p which is greater than counterpressure limit pg.

Figure 1C:
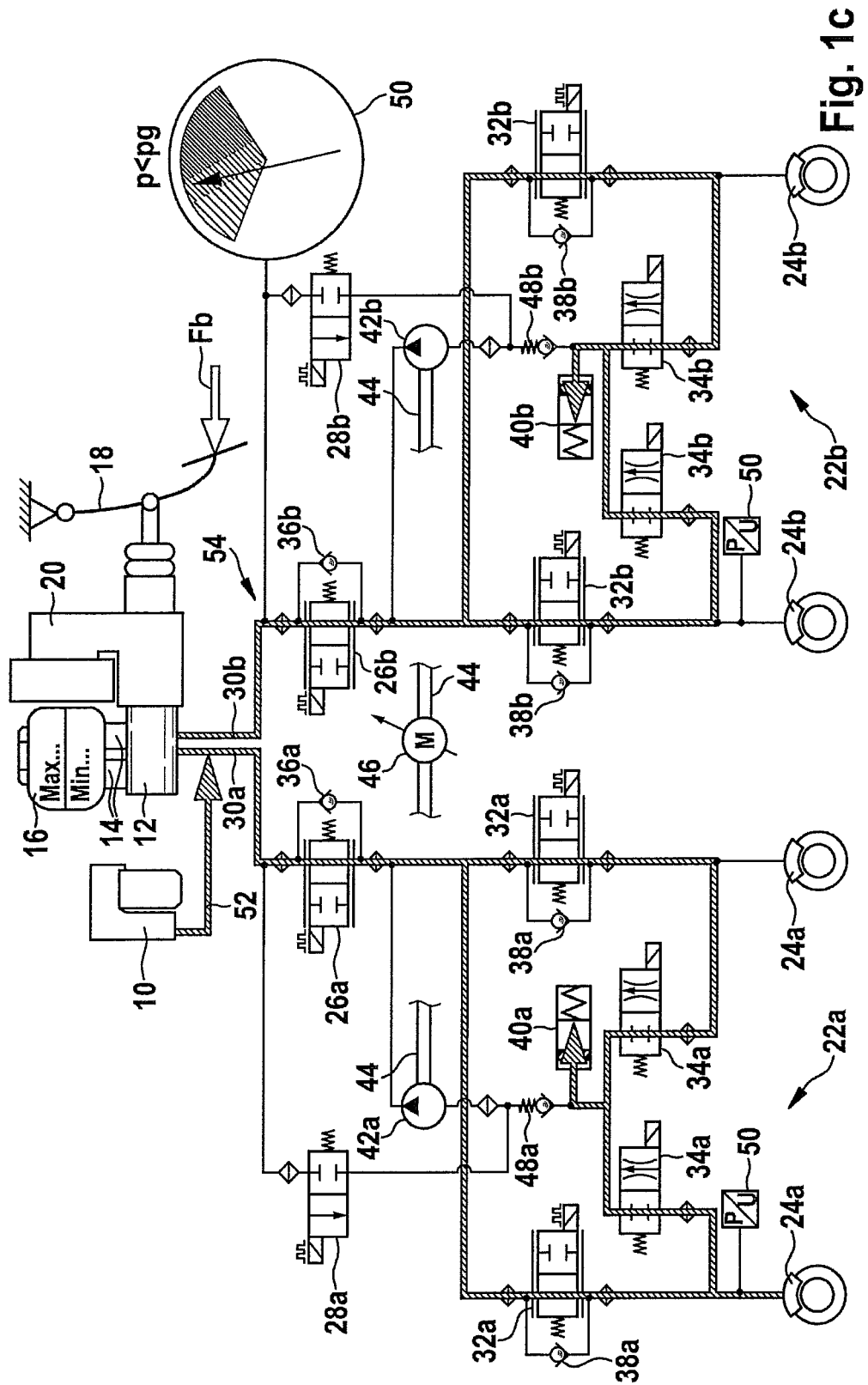

If it is recognized during the comparison between the actual pressure variable and the predefined reference pressure variable that the actual pressure variable exceeds the reference pressure variable, at least a pre-pressure is reduced in the braking system (prior to transferring the brake fluid volume from plunger device 10 into the at least one brake circuit 22a and 22b). This takes place, for example, by controlling at least one valve device of the braking system to an at least partially open state in order to reduce at least the pre-pressure in the braking system. For example, as represented in FIG. 1c, at least one wheel outlet valve 34a and 34b may be controlled to an at least partially open state as the at least one valve device in order to reduce at least the pre-pressure in the braking system. Therefore, brake fluid is displaceable into the at least one storage chamber 40a and 40b via the at least one wheel outlet valve 34a and 34b. In this way, counterpressure p which counteracts plunger device 10 is reducible to a value below counterpressure limit pg (see FIG. 1c). Above all, the pressure present in the two brake circuits 22a and 22b may be reduced in this way below braking counterpressure pg.

As soon as counterpressure p is below counter pressure limit pg, the brake pressure in the at least one brake circuit 22a and 22b of the braking system may be increased by transferring the brake fluid volume from plunger device 10 into the at least one brake circuit 22a and 22b of the braking system. In particular, the transfer of brake fluid volume from plunger device 10 into the at least one brake circuit 22a and 22b may be started already during the discharge of brake fluid via the at least one at least partially open wheel outlet valve 34a and 34b into the at least one storage chamber 40a and 40b.

Upon reaching a counterpressure p which is less than or equal to counterpressure limit pg as a result of the brake fluid being discharged into the at least one storage chamber 40a and 40b and upon reaching the counterpressure reduction resulting therefrom, plunger device 10 is able to reliably transfer the brake fluid volume to the at least one brake circuit 22a and 22b.

In this specific embodiment, the pressure in the braking system is therefore reduced to a value below counterpressure limit pg for a short time period. This may temporarily cause an actuating path of brake actuating element 18 to become longer. Since the pressure reduction in the braking system is, however, correctable to a value below counterpressure limit pg after a short time, the driver generally does not notice the longer brake actuating path.

It is pointed out that in order to carry out the method step represented schematically in FIG. 1c, a component may be used which is conventionally already present in an ESP braking system. Thus, additionally equipping the braking system with a further component is not required for the method to be carried out. Moreover, in order to carry out the method step represented in FIG. 1c, it is not necessary to configure plunger device 10 in such a way that it is able to counteract a counterpressure p up to a comparatively high counterpressure limit pg. The braking system may thus be equipped with a cost-effective plunger device 10 which needs little installation space and/or has low energy consumption.

Optionally, at least the pre-pressure in the braking system may be increased by the pressure difference (which was previously reduced) after reducing at least the pre-pressure in the braking system by a pressure difference and during/or after transferring the brake fluid volume from plunger device 10 into the at least one brake circuit 22a and 22b. This may also be referred to as a correction of the pressure and volume balance of the braking system.

For example, wheel outlet valves 34a and 34b of the braking system may be controlled from an at least partially open state to a closed state during and/or after conveying the brake fluid volume into the at least one brake circuit 22a and 22b with the aid of plunger device 10. Subsequently, the brake fluid which was displaced previously into the at least one storage chamber 40a and 40b may be returned with the aid of the at least one pump 42a and 42b. Thus, balancing of the pressure and volume state may be carried out in a simple manner and with the aid of a component which is conventionally already present in the braking system.

Figure 1D:
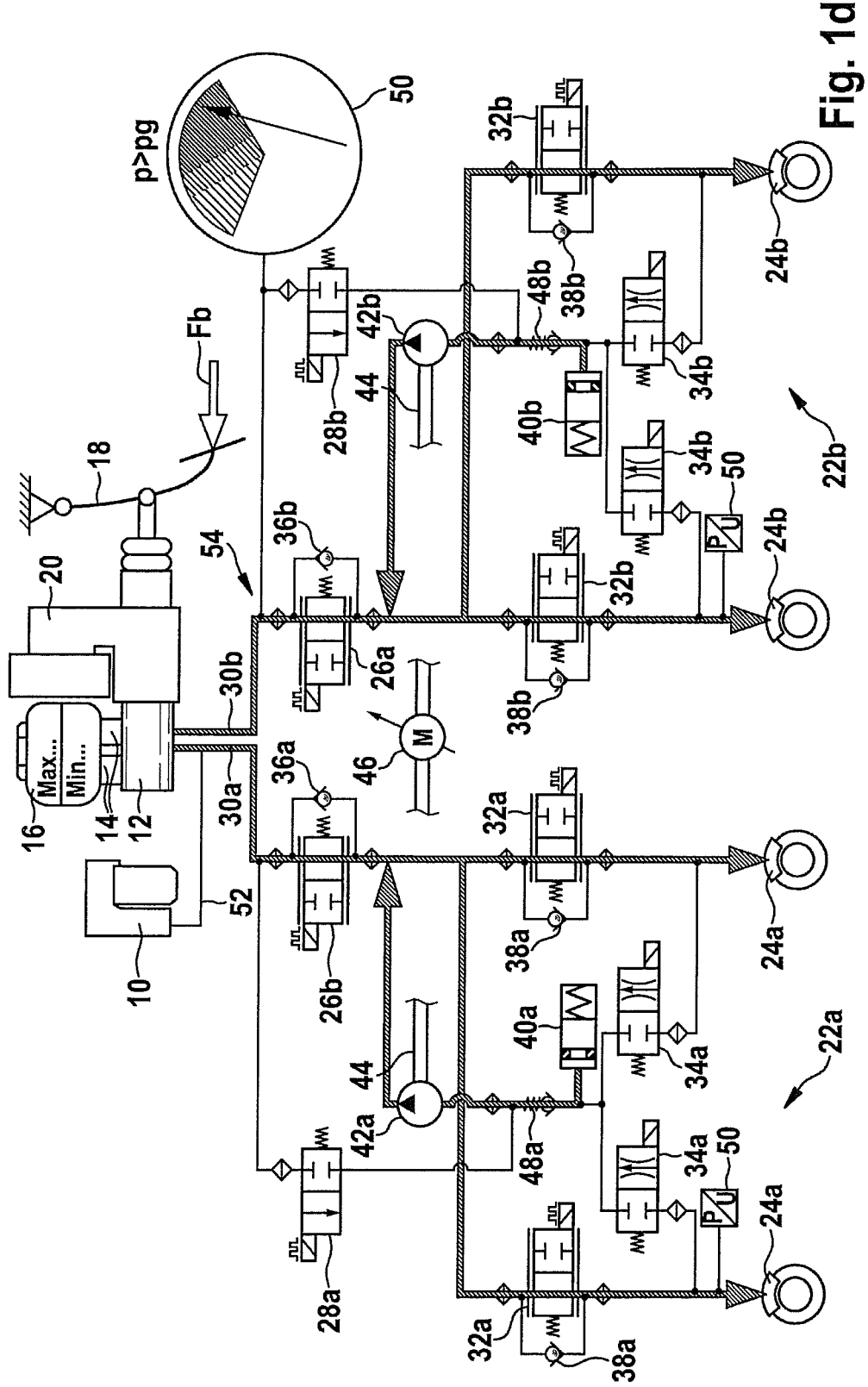

With the aid of the method step which is represented schematically in FIG. 1d, counterpressure p present in section 54 may be raised again to a value above counterpressure limit pg. The driver has a standard brake actuating feeling, after the method described in the previous paragraphs is carried out.

Figure 2:
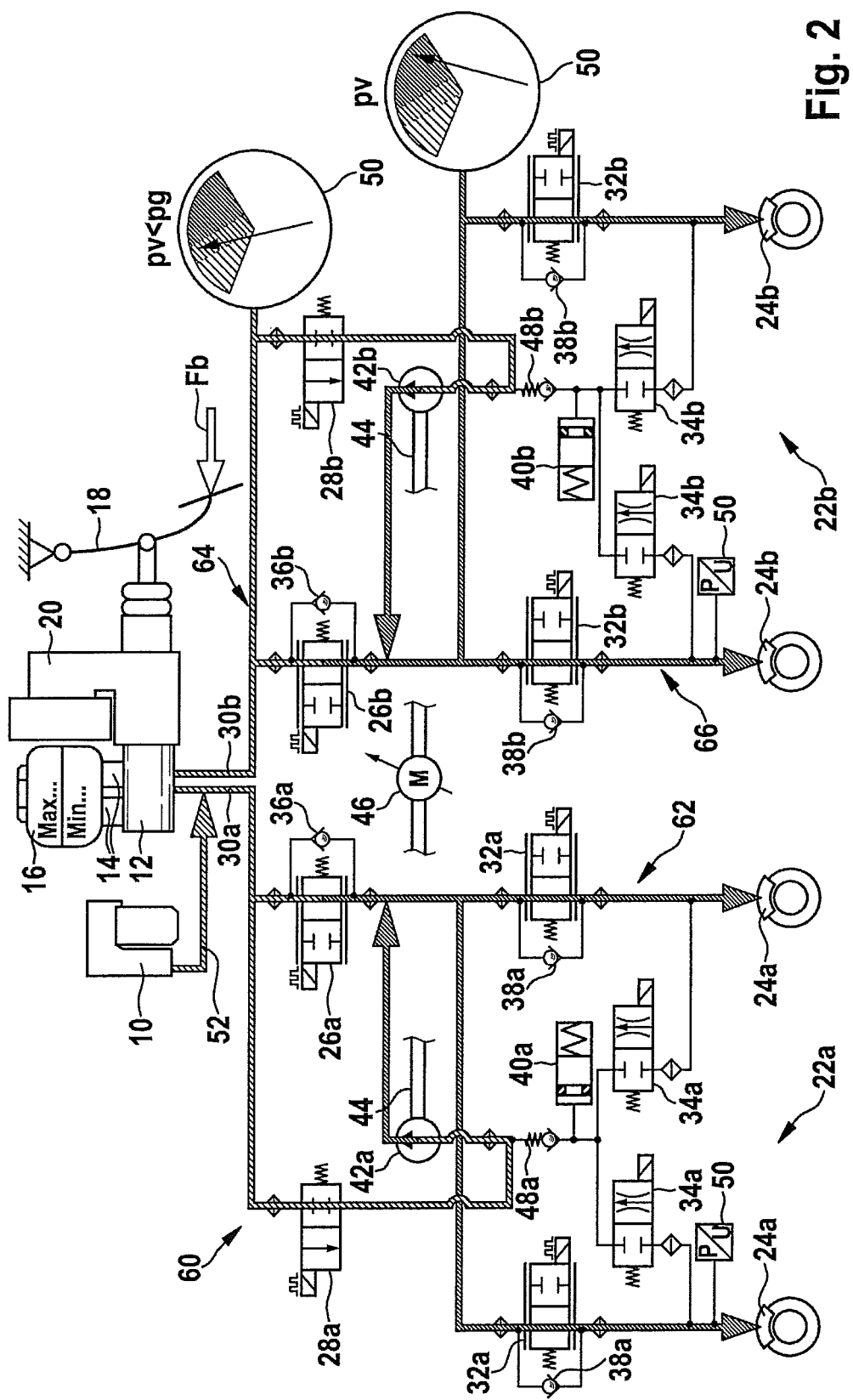
FIG. 2 shows a schematic representation of a braking system which is operated with the aid of a second specific embodiment of the method.

FIG. 2 shows a schematic representation of a braking system which is operated with the aid of a second specific embodiment of the method.

The braking system represented schematically in FIG. 2 has the components which have been already described above. For this reason, the braking system will not be described here again.

The represented method differs from the previously described specific embodiment in that (upon recognition of an actual pressure variable which is above the reference pressure variable, or in the case of the operating situation represented in FIG. 1b) at least one high-pressure switching valve 28a and 28b is controlled as the at least one valve device to an at least partially open state in order to reduce at least the pre-pressure in the braking system. At the same time, brake fluid is pumped with the aid of pump 42a of first brake circuit 22a from a first brake circuit section 60, which is delimited by brake master cylinder 12, a switchover valve 26a of first brake circuit 22a, and pump 42a of first brake circuit 22a, into a first remaining brake circuit section 62 of first brake circuit 22a. In this way, an initial pre-pressure present in first brake circuit section 60 is reducible, while the pressure prevailing in the first remaining brake circuit section is increasable at the same time. In addition, brake fluid may be pumped with the aid of pump 42b of second brake circuit 22b from a second brake circuit section 64, which is delimited by brake master cylinder 12, a switchover valve 26b of second brake circuit 22b, and pump 42b of second brake circuit 22b, into a second remaining brake circuit section 66 of second brake circuit 22b. Thus, a second pre-pressure pv present in second brake circuit section 64 is reducible below counterpressure limit pg, while a pressure pr prevailing in second remaining brake circuit section 66 is increasable at the same time. It is pointed out that the brake pressure present in wheel brake calipers 24a and 24b corresponds/may correspond to the braking intent of the driver despite the reduction of the pre-pressure in the at least one brake circuit section 60 and 64.

Pre-pressure pv may thus be referred to as a pressure which is present in first brake circuit section 60 and/or in second brake circuit section 64. Likewise, the at least one pre-pressure pv of a braking system may be understood to mean a pressure which is present in at least one brake circuit 22a or 22b between brake master cylinder 12, a switchover valve 26a or 26b and/or a high-pressure switching valve 28a or 28b. Pre-pressure pv is also definable as the pressure which is present in at least one feed line 30a and 30b.

If the pre-pressure is reduced below counterpressure limit pg at least in one brake circuit section 60, which is hydraulically connected to plunger device 10, plunger device 10 may convey brake fluid at least into brake circuit section 60 connected thereto. Thus, it is not necessary to reduce the pressure present in entire brake circuits 22a and 22b below counterpressure limit pg in order to carry out the method described here. The advantageous method may therefore be carried out using comparatively little energy.

In this specific embodiment of the method, the brake fluid volume which was pumped previously into the at least one remaining circuit section 62 and 66 may also be returned after the brake fluid volume has been displaced from plunger device 10 into the at least one brake circuit section 60. Thus, the driver also has a standard brake actuating feeling (pedal feeling) after the specific embodiment described here is carried out.

Alternatively or additionally to the specific embodiments described above, a brake support force applied to the at least one displaceable piston of brake master cylinder 12 may also be reduced with the aid of brake booster device 20 in order to reduce at least the pre-pressure in the braking system. Such a reduction of the brake support force may cause a pressure reduction in brake master cylinder 12 and at least in feed lines 30*a* and 30*b* which are connected to brake master cylinder 12. Thus, after reducing the brake support force with the aid of plunger device 10, the brake fluid volume may also be displaced from the storage volume of plunger device 10 at least into at least one feed line 30*a*.

In one advantageous refinement, it may also be ensured by activating brake booster device 20 that the driver has a standard brake actuating feeling despite the temporary reduction of at least pre-pressure pr/counterpressure p below counterpressure limit pg. For this purpose, a reduction of a restoring force which results from the reduction of at least pre-pressure pr/counterpressure p and which is applied to the at least one displaceable piston of the brake master cylinder by the pressure present therein may be compensated for (at least to some extent) by reducing the brake support force of brake booster device 20. A restoring force may in particular be understood to mean a force which acts against the braking intervention of the at least one displaceable piston of the brake master cylinder and against which the at least one displaceable piston is displaceable with the aid of the driver braking force and/or the brake support force.

To carry out the advantageous refinement, it is possible to establish a setpoint brake support force reduction by taking into account an opening time of the at least one valve device which is controlled to the partially open state, a pump power of the at least one pump which is used for reducing at least the pre-pressure and/or the reduction of at least the pre-pressure. Subsequently, brake booster device 20 may be activated in such a way that the brake support force which is applied to the at least one displaceable piston of the brake master cylinder is reduced according to the established setpoint brake support force reduction. This may be carried out in such a way that the at least one displaceable piston of brake master cylinder 12 remains in the position it assumed prior to the reduction despite the reduction of at least the pre-pressure.

With the aid of the method described in the previous paragraphs, it is thus possible to expand the possible applications of a plunger device 10 for reducing a reduction over time of a non-hydraulic additional braking torque, e.g., of a generator braking torque. Likewise, the described method may be used to employ the plunger device for increasing the brake pressure present in wheel brake calipers 24*a* and 24*b* despite a comparatively high pressure in a braking system.

Moreover, an advantageous brake actuating feeling (pedal feeling) is implementable for the driver with the aid of the method described here despite the temporary reduction of at least the pre-pressure. In this way, the pedal path extension is eliminated which frequently conventionally occurs due to the inability to use a plunger component for returning a brake fluid volume.

FIG. 3 shows a schematic illustration of a specific embodiment of the control unit.

The control unit which is schematically represented in FIG. 3 is configured for interacting with a braking system which is equipped with a plunger device 10. For example, the control unit may be employed in the braking system described above. The employability of the control unit is, however, not limited to a certain type of a braking system. (For the sake of clarity, the illustration of the braking system is dispensed with in FIG. 3.)

The control unit has a first receiver 70 with the aid of which at least one setpoint pressure increase information signal 72 is receivable with regard to a pressure increase, which is to be carried out with the aid of plunger device 10, in at least one brake circuit of the braking system. In particular, a setpoint pressure increase information signal 72 with regard to a reduction over time of a non-hydraulic additional braking torque, e.g., of a generator braking torque, may also be receivable with the aid of first receiver 70. First receiver 70 is moreover configured to output a piece of setpoint pressure increase information 74, which corresponds to setpoint pressure increase information signal 72, to a control device 76 of the control unit.

With the aid of control device 76, a plunger control signal 78 may be output to plunger device 10 by taking into account the (received) setpoint pressure increase information 74. In particular, plunger device 10 may be activatable with the aid of plunger control signal 78 in such a way that a brake fluid volume which corresponds to setpoint pressure increase information signal 72/to the setpoint pressure increase information 74 is transferable into the at least one brake circuit of the braking system with the aid of plunger device 10 which is activated by plunger control signal 78.

Moreover, the control unit has a second receiver 80 with the aid of which at least one actual pressure variable signal 82 is receivable with regard to an actual pressure present at least in a subsection of the braking system. An actual pressure variable 84 which corresponds to actual pressure variable signal 82 may be output to control device 76 with the aid of second receiver 80. Examples of actual pressure variable signal 82/actual pressure variable 84 have already been described above.

Control device 76 is additionally configured to compare actual pressure variable 84 to a predefined reference pressure variable (not illustrated) prior to outputting plunger control signal 78. If actual pressure variable 84 exceeds the reference pressure variable, control device 76 is configured to output at least one pressure-reducing control signal 86 to at least one component 20, 26*a*, 26*b*, 28*a*, 28*b*, 34*a*, 34*b*, 42*a* and/or 42*b* of the braking system, taking into account a deviation of actual pressure variable 84 from the reference pressure variable. It is ensured in this way that at least one pre-pressure in the braking system is reducible with the aid of the at least one component 20, 26*a*, 26*b*, 28*a*, 28*b*, 34*a*, 34*b*, 42*a* and/or 42*b* of the braking system which is activated by at least one pressure-reducing control signal 86.

For example, control device 76 may be configured to output at least one valve control signal as the at least one pressure-reducing control signal 86 to at least one valve device 26*a*, 26*b*, 28*a*, 28*b*, 34*a* and/or 34*b* of the braking system prior to outputting plunger control signal 78, the at least one valve device 26*a*, 26*b*, 28*a*, 28*b*, 34*a* and/or 34*b* being controllable to an at least partially open state with the aid of the at least one valve control signal. Activatable valve device 26*a*, 26*b*, 28*a*, 28*b*, 34*a* and/or 34*b* may be, for example, at least one wheel outlet valve 34*a* and 34*b*. Alternatively or additionally, the at least one activatable valve device 26*a*, 26*b*, 28*a*, 28*b*, 34*a* and/or 34*b* may also be a switchover valve 26*a* and 26*b* and/or a high-pressure switching valve 28*a* and 28*b*.

At least one pump 42a and 42b may also be activatable with the aid of a pump control signal as the at least one pressure-reducing control signal 86.

Alternatively or additionally, control device 76 may also be configured to output a brake booster control signal as the at least one pressure-reducing control signal 86 to a brake booster device 20 of the braking system prior to outputting plunger control signal 78. Brake booster device 20 may be activatable with the aid of the brake booster control signal in such a way that a brake support force is reducible which is applied to at least one displaceable piston of a brake master cylinder of the braking system with the aid of brake booster device 20 of the braking system.

In one advantageous refinement, control device 76 is additionally configured to output a counterpressure adaptation signal to brake booster device 20 of the braking system, brake booster device 20 being activatable with the aid of the counterpressure adaptation signal in such a way that a restoring force which is caused by the reduction of at least the pre-pressure and which is applied to the at least one displaceable piston of the brake master cylinder is compensated for (at least to some extent) by reducing the brake support force of brake booster device 20 of the braking system.

Additionally, control device 76 may be additionally configured to output at least one pressure-increasing control signal (not illustrated) to at least one component of the braking system, taking into account the deviation of actual pressure variable 84 from the reference pressure variable and/or of the at least one pressure-reducing control signal 86 after outputting plunger control signal 78, so that at least the pre-pressure in the braking system is increasable by a previously reduced pressure difference with the aid of the at least one component of the braking system which is activated by at least one pressure-increasing control signal.

What is claimed is:

1. A method for operating a braking system of a vehicle which is equipped with a plunger device, the method comprising:
    increasing a brake pressure in at least one brake circuit of the braking system by transferring a brake fluid volume from the plunger device into the at least one brake circuit of the braking system;
    comparing an actual pressure variable to a predefined reference pressure variable with regard to an actual pressure present at least in one subsection of the braking system before the brake pressure is increased; and
    if the actual pressure variable exceeds the predefined reference pressure variable, at least one pre-pressure is reduced in the braking system prior to transferring the brake fluid volume from the plunger device into the at least one brake circuit.

2. The method of claim 1, wherein at least one valve device of the braking system is controlled to an at least partially open state to reduce at least the pre-pressure in the braking system.

3. The method of claim 2, wherein at least one wheel outlet valve is controlled to the at least partially open state as the at least one valve device to reduce at least the pre-pressure in the braking system.

4. The method of claim 2, wherein at least one of at least one high-pressure switching valve and at least one switchover valve is controlled to the at least partially open state as the at least one valve device to reduce at least the pre-pressure in the braking system.

5. The method of claim 1, wherein a brake support force is reduced which is applied to at least one displaceable piston of a brake master cylinder of the braking system with the aid of a brake booster device to reduce at least the pre-pressure in the braking system.

6. The method of claim 5, wherein a reduction of a restoring force which results from the reduction of at least the pre-pressure and which is applied to the at least one displaceable piston of the brake master cylinder is compensated for at least to some extent by reducing the brake support force of the brake booster device of the braking system.

7. The method of claim 1, wherein at least the pre-pressure in the braking system is increased by a pressure difference after the reduction of at least the pre-pressure in the braking system by the pressure difference and after the transfer of the brake fluid volume from the plunger device into the at least one brake circuit.

8. A control unit for a braking system of a vehicle which is equipped with a plunger device, comprising:
    a first receiver, with the aid of which at least one piece of setpoint pressure increase information is receivable with regard to a pressure increase, wherein the pressure increase is to be carried out with the aid of the plunger device, in at least one brake circuit of the braking system;
    a control device with the aid of which a plunger control signal is outputtable to the plunger device by taking into account the received setpoint pressure increase information, so that a brake fluid volume which corresponds to the setpoint pressure increase information is transferable from the plunger device, the plunger device being activated by the plunger control signal, into the at least one brake circuit of the braking system; and
    a second receiver, with the aid of which at least one actual pressure variable is receivable with regard to at least one actual pressure present in a subsection of the braking system;
    wherein the control device is additionally configured to compare the actual pressure variable to a predefined reference pressure variable prior to outputting the plunger control signal, and, if the actual pressure variable exceeds the predefined reference pressure variable, the control device is configured to output at least one pressure-reducing control signal to at least one component of the braking system, taking into account a deviation of the actual pressure variable from the predefined reference pressure variable, so that at least a pre-pressure in the braking system is reducible with the aid of the at least one component of the braking system which is activated by at least one pressure-reducing control signal.

9. The control unit of claim 8, wherein the control device is configured to output at least one valve control signal as the at least one pressure-reducing control signal to at least one valve device of the braking system prior to outputting the plunger control signal, and the at least one valve device is controllable to an at least partially open state with the aid of the at least one valve control signal.

10. The control unit of claim 9, wherein the control device is configured to output the at least one valve control signal at least one of to at least one wheel outlet valve, to at least one high-pressure switching valve, and to at least one switchover valve prior to outputting the plunger control signal.

11. The control unit of claim 8, wherein the control device is configured to output a brake booster control signal as the at least one pressure-reducing control signal to a brake booster device of the braking system prior to outputting the plunger control signal, and the brake booster device is activatable with the aid of the brake booster control signal so that a brake support force, which is applied to at least one displaceable piston of a brake master cylinder of the braking system, is reducible with the aid of brake booster device.

12. The control unit of claim 11, wherein the control device is additionally configured to output a counterpressure adaptation signal to the brake booster device of the braking system, and the brake booster device is activatable with the aid of the counterpressure adaptation signal so that a restoring force which is caused by the reduction of at least the pre-pressure and which is applied to the at least one displaceable piston of the brake master cylinder is compensated for at least to some extent by reducing the brake support force of the brake booster device of the braking system.

13. The control unit of claim 8, wherein the control device is additionally configured to output at least one pressure-increasing control signal to at least one component of the braking system, taking into account the deviation of at least one of the actual pressure variable from the predefined reference pressure variable and of the at least one pressure-reducing control signal after outputting the plunger control signal, so that at least the pre-pressure in the braking system is increasable by a pressure difference with the aid of the at least one component of the braking system which is activated by at least one pressure-increasing control signal.

14. A braking system for a vehicle, including:
a control unit control unit for a braking system of a vehicle which is equipped with a plunger device, including:
a first receiver, with the aid of which at least one piece of setpoint pressure increase information is receivable with regard to a pressure increase, which is to be carried out with the aid of the plunger device, in at least one brake circuit of the braking system;
a control device with the aid of which a plunger control signal is outputtable to the plunger device by taking into account the received setpoint pressure increase information, so that a brake fluid volume which corresponds to the setpoint pressure increase information is transferable from the plunger device, the plunger device being activated by the plunger control signal, into the at least one brake circuit of the braking system; and
a second receiver, with the aid of which at least one actual pressure variable is receivable with regard to at least one actual pressure present in a subsection of the braking system;
wherein the control device is additionally configured to compare the actual pressure variable to a predefined reference pressure variable prior to outputting the plunger control signal, and, if the actual pressure variable exceeds the predefined reference pressure variable, the control device is configured to output at least one pressure-reducing control signal to at least one component of the braking system, taking into account a deviation of the actual pressure variable from the predefined reference pressure variable, so that at least a pre-pressure in the braking system is reducible with the aid of the at least one component of the braking system which is activated by at least one pressure-reducing control signal.

* * * * *